United States Patent
Le Hir et al.

(10) Patent No.: US 7,276,827 B2
(45) Date of Patent: Oct. 2, 2007

(54) MOTORIZED REDUCTION GEAR FOR FUNCTIONAL EQUIPMENT OF A VEHICLE

(75) Inventors: Michel Le Hir, Conde sur Noireau (FR); Alain Jeusset, Amaye sur Orne (FR)

(73) Assignee: Meritor LVS France, Sully-sur-Loire (FR)

( * ) Notice: Subject to any disclaimer, the term of this patent is extended or adjusted under 35 U.S.C. 154(b) by 1357 days.

(21) Appl. No.: 09/760,017

(22) Filed: Jan. 12, 2001

(65) Prior Publication Data

US 2001/0019231 A1    Sep. 6, 2001

(30) Foreign Application Priority Data

Jan. 13, 2000   (FR) .................................. 00 00412

(51) Int. Cl.
  *H02K 11/00* (2006.01)
  *H02K 23/66* (2006.01)
(52) U.S. Cl. ................ 310/68 B; 310/239; 324/207.11
(58) Field of Classification Search .............. 310/68 B, 310/239, 75 R; 324/207.11, 207.2
See application file for complete search history.

(56) References Cited

U.S. PATENT DOCUMENTS 5,565,721 A * 10/1996 Knappe .................. 310/68 B
  2001/0019231 A1 * 9/2001 Hir et al. ................ 310/68 B

FOREIGN PATENT DOCUMENTS

| DE | 8811966 | | 7/1989 |
|---|---|---|---|
| DE | 198 11 424 | * | 2/1999 |
| DE | 19811424 | | 5/1999 |
| FR | 2663798 | * | 12/1991 |
| JP | 11308812 | | 5/1999 |
| JP | 11-308812 | * | 11/1999 |

OTHER PUBLICATIONS

Translation of French Patent 2,663,798, Schechinger et al., Jun. 1991.*
Translation of Nishmura, JP-11-308,812; May 1999.*
International Search Report, French Application 582323, Nov. 2000.

* cited by examiner

*Primary Examiner*—Karl Tamai
(74) *Attorney, Agent, or Firm*—Carlson, Gaskey & Olds

(57) ABSTRACT

A motorized reduction gear intended for functional equipment of a vehicle includes a rotor having with a rotor shaft bearing a commutator, a reduction gearbox containing a gearwheel engaged with a worm belonging to the shaft, and a magnetic ring attached to the commutator and mounted on the shaft to count the number of shaft rotations. The ring can be attached to the commutator in various ways, for example by overmolding the ring on the body such that the ring lies over virtually the entire length of the body. Hooks that retain the electrical connection of the rotor are attached to the magnetic ring. The attachment of the ring directly on the commutator, of which the ring forms an integral part, makes it possible to ensure reliable and lasting retention of the ring.

10 Claims, 2 Drawing Sheets

MOTORIZED REDUCTION GEAR FOR FUNCTIONAL EQUIPMENT OF A VEHICLE

BACKGROUND OF THE INVENTION

The subject of the present invention is a motorized reduction gear intended for functional equipment of a vehicle, such as a window lifter, sunroof, etc.

Such a motorized reduction gear comprises a rotor provided with a rotor shaft bearing a commutator, and a reduction gearbox containing a gearwheel engaged with a worm belonging to the shaft. In order that the number of shaft rotations can be counted, a magnetic ring is mounted on the shaft, between the commutator and a rolling bearing placed in the gearbox. This mounting is achieved by force (a "press fit") using longitudinal notches made on the shaft, which hold the ring in place.

This arrangement therefore requires two pieces to be assembled on the motorized reduction gear assembly lines. It is found that, after a certain time in service, the retention of the ring on the shaft becomes insecure, the ring having a tendency to detach from the shaft, which may in certain cases even lead to the destruction of this magnetic ring. This defective retention of the ring on the shaft may arise from a fault in the alignment of the ring with the shaft during the assembly operation, and, where appropriate, from the fact that the internal diameter of the magnetic ring is too small.

The aim of the invention is therefore to provide a motorized reduction gear in which the magnetic ring for counting the shaft rotation rate is attached to the shaft in a way which is more reliable over time.

SUMMARY OF THE INVENTION

According to the invention, a magnetic ring is attached to the commutator of the shaft.

This attachment to the commutator can be carried out more securely than attachment to the part of the shaft between the commutator and the bearing, and can be by various means.

According to one embodiment of the invention, the magnetic ring is overmolded on the body of the commutator.

According to a second possible embodiment, the magnetic ring is housed in an annular recess which is on the body of the commutator, on which it is adhesively bonded or overmolded.

BRIEF DESCRIPTION OF THE DRAWINGS

Other particular features and advantages of the invention will appear during the following description, given with reference to the appended drawings which illustrate several possible embodiments thereof.

DETAILED DESCRIPTION OF THE PREFERRED EMBODIMENT

Figure 1:
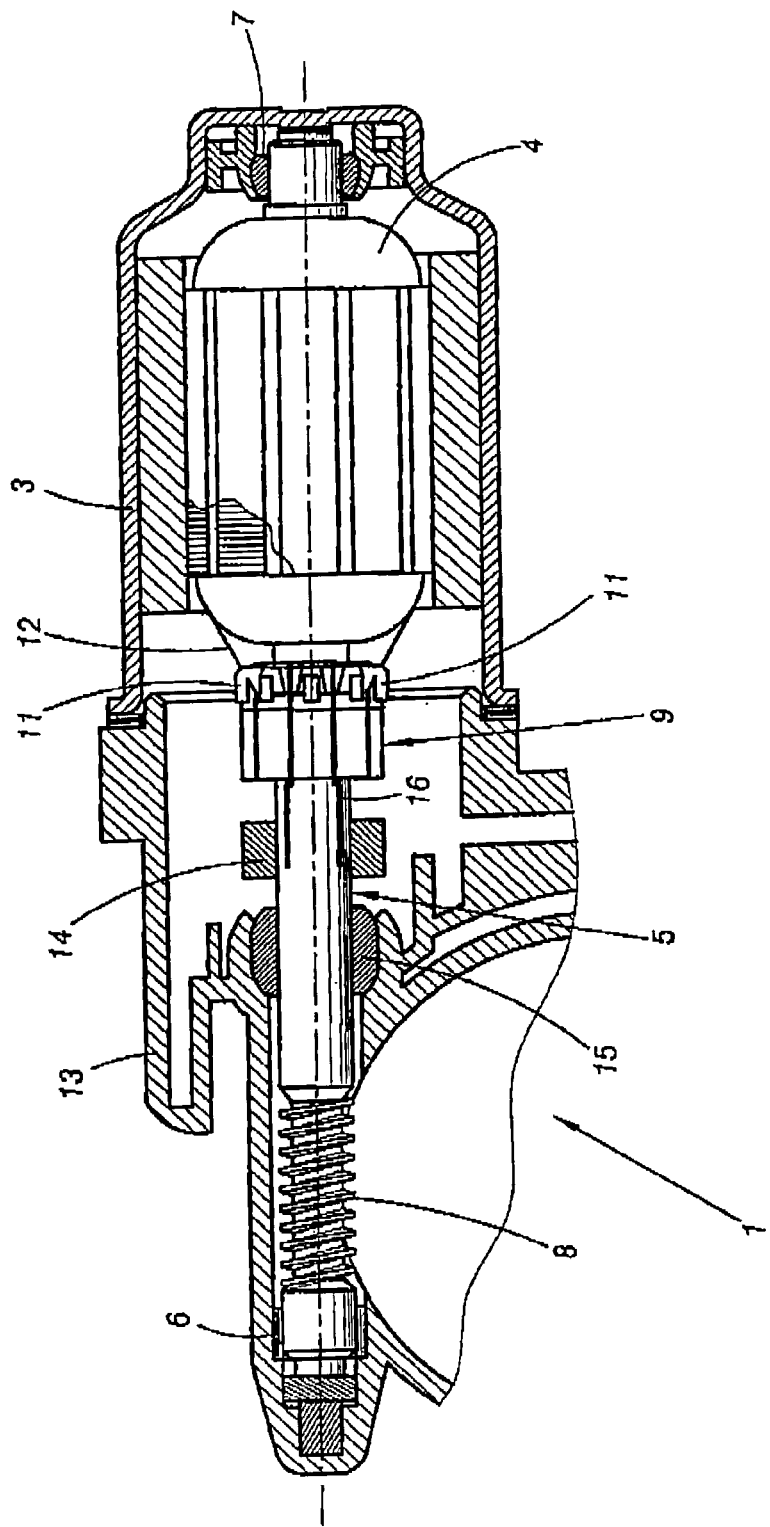
FIG. 1 is a view in longitudinal elevation and partial section of a motorized reduction gear for driving functional equipment of motor vehicles, according to the prior art of the invention.

The motorized reduction gear 1 illustrated in FIG. 1 is intended especially for driving functional equipment of vehicles, such as electric window-lifters and sunroofs.

The motorized reduction gear 1 comprises, housed inside a casing which can be powered by electrical connections, a stator 3 and a rotor 4 provided with a rotor shaft 5, the ends of which are mounted in rolling bearings 6, 7. This rotor shaft 5 bears a worm 8 engaged with a gearwheel which can drive an output member, which itself drives the equipment associated with the motorized reduction gear 1, for example, a window lifter.

The rotor shaft 5 bears a commutator 9 equipped on its periphery with a series of hooks 11 for retaining the electrical connections 12 of the rotor 4. The shaft 5 is housed inside a reduction gearbox 13 which also contains the gearwheel and the output member.

The motorized reduction gear 1 is provided with a magnetic ring 14 mounted, according to the prior art of the invention as illustrated in FIG. 1, on the part of the shaft 5 between the commutator 9 and a rolling bearing 15 housed in the reduction gearbox 13. The magnetic ring 14 is held in place by means of the longitudinal notches 16 in the shaft 5 and has the function of enabling the rotation rate of the shaft 5 to be measured, in combination with known means.

Figure 2:
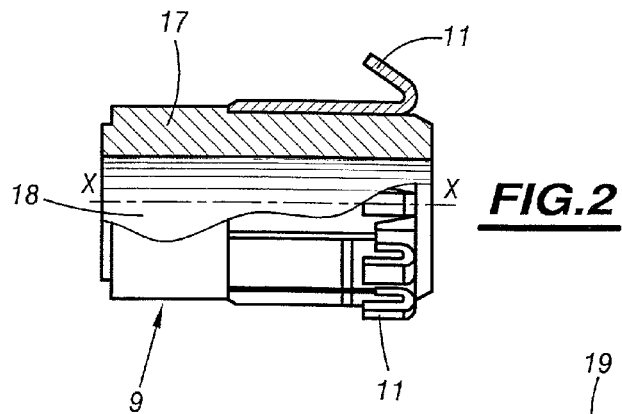
FIG. 2 is a view in longitudinal elevation of the commutator of the motorized reduction gear, equipped with a magnetic counting ring attached according to a first embodiment of the invention.

According to a first embodiment of the invention, illustrated in FIG. 2, the motorized reduction gear 1 is fitted with a magnetic ring 17 overmoulded on the body 18 of the commutator 9. The ring 17 forms a bushing lying over substantially the entire length of the body 18, the hooks 11 being themselves attached to the periphery of the ring 17, which forms an integral part of the commutator 9.

Figure 3:
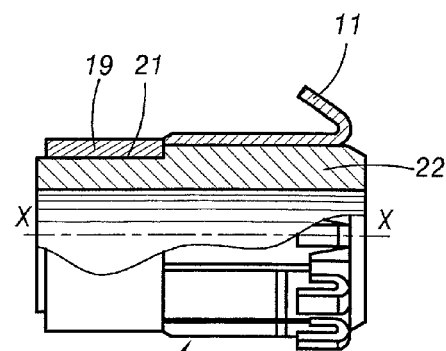
FIGS. 3, 4 and 5 are views in elevation of the commutator which are similar to FIG. 2, showing three other possible embodiments of the invention.

In the second embodiment of the invention, illustrated in FIG. 3, the magnetic ring 19 is housed in an annular recess 21 which is on the body 22 of the commutator 23 at the end of it which is free of hooks 11. The ring 19 is attached within the recess 21 by adhesive bonding or by overmolding.

Figure 4:
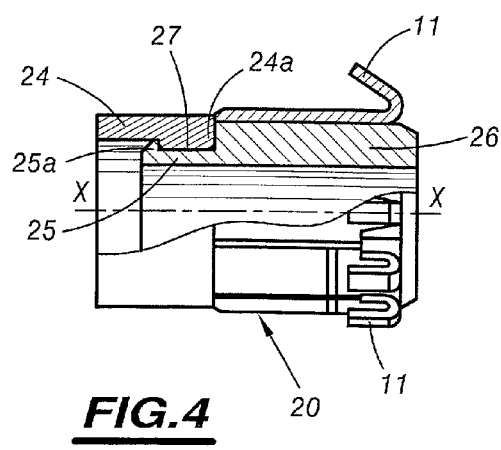

In the third embodiment of the invention illustrated in FIG. 4, the magnetic ring 24 is elastically clipped onto an annular extension 25 of the body 26 of the commutator 20. This extension 25 defines, in that end of the body 26 which is free of hooks 11, an annular housing 27 in which a radially projecting end 24a of the ring 24 can be clipped, after passing over a terminal boss 25a projecting radially from the extension 25.

Figure 5:
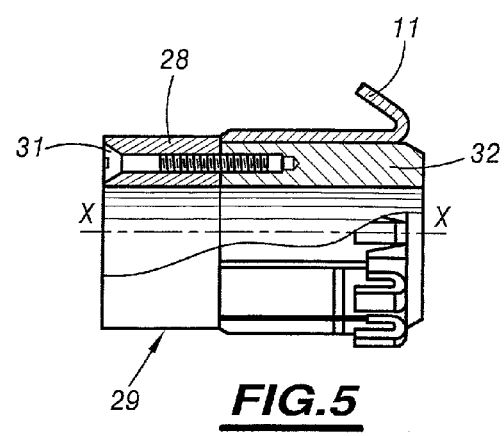

In the fourth embodiment of the invention illustrated in FIG. 5, the magnetic ring 28 is attached to one end of the commutator 29 which is free of hooks 11, by at least two screws 31 parallel to the longitudinal axis XX of the commutator 29 and diametrically opposed. The screws 31 pass through the entire width of the ring 28, screwing into the body 32 of the commutator 29.

Other means for attaching the magnetic ring to the commutator of the motorized reduction gear can be envisaged within the scope of the invention. Attaching the ring directly to the body of the commutator makes it possible to achieve a secure and lasting assembly.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A motorized reduction gear comprising:
   a rotor provided with a rotor shaft bearing a commutator;
   said commutator including a body having an inner surface mounted on said rotor shaft and an opposing outer surface;
   a reduction gearbox containing a gearwheel engaged with a worm of said rotor shaft; and
   a magnetic ring mounted on said rotor shaft so that a number of rotations of said rotor shaft can be counted, wherein said magnetic ring is attached on said opposing outer surface of said body of said commutator.

2. The motorized reduction gear as recited in claim 1, wherein said magnetic ring is overmolded on said body of said commutator.

3. The motorized reduction gear as recited in claim 1, wherein said body of said commutator includes an annular recess and said magnetic ring is housed in and adhesively bonded to said annular recess.

4. The motorized reduction gear as recited in claim 1, wherein said commutator includes an annular recess located at an end of said commutator, and said magnetic ring is housed in said annular recess of said commutator.

5. The motorized reduction gear as recited in claim 4, wherein said end of said commutator is free of hooks.

6. The motorized reduction gear as recited in claim 1, wherein said commutator includes a body having an annular recess, and said magnetic ring is housed in and overmolded on said annular recess of said commutator.

7. The motorized reduction gear as recited in claim 1, further including an attachment feature that attaches said magnetic ring to said commutator.

8. The motorized reduction gear as recited in claim 7, wherein said attachment feature is an elastic clip.

9. The motorized reduction gear as recited in claim 7, wherein said attachment feature is an adhesive.

10. A motorized reduction gear comprising:
    a rotor provided with a rotor shaft bearing a commutator;
    said commutator including an annular extension and a body having an inner surface mounted on said rotor shaft and an opposing outer surface;
    a reduction gearbox containing a gearwheel engaged with a worm of said rotor shaft; and
    a magnetic ring mounted on said rotor shaft so that a number of rotations of said rotor shaft can be counted, wherein said magnetic ring is attached on said opposing outer surface of said body of said commutator and is elastically clipped onto said annular extension of said commutator.

* * * * *

UNITED STATES PATENT AND TRADEMARK OFFICE
CERTIFICATE OF CORRECTION

PATENT NO.       : 7,276,827 B2                                          Page 1 of 1
APPLICATION NO.  : 09/760017
DATED            : October 2, 2007
INVENTOR(S)      : Le Hir et al.

It is certified that error appears in the above-identified patent and that said Letters Patent is hereby corrected as shown below:

ON THE TITLE PAGE, item (54) should read --MOTORIZED REDUCTION GEAR WITH A COMMUTATOR HAVING AN INTEGRAL MAGNETIC RING--

Signed and Sealed this

Twenty-fifth Day of December, 2007

JON W. DUDAS
*Director of the United States Patent and Trademark Office*